Jan. 28, 1958     J. D. RUSSELL     2,821,286
WICKET FOR SHEET CONVEYOR
Filed July 12, 1954     2 Sheets-Sheet 1
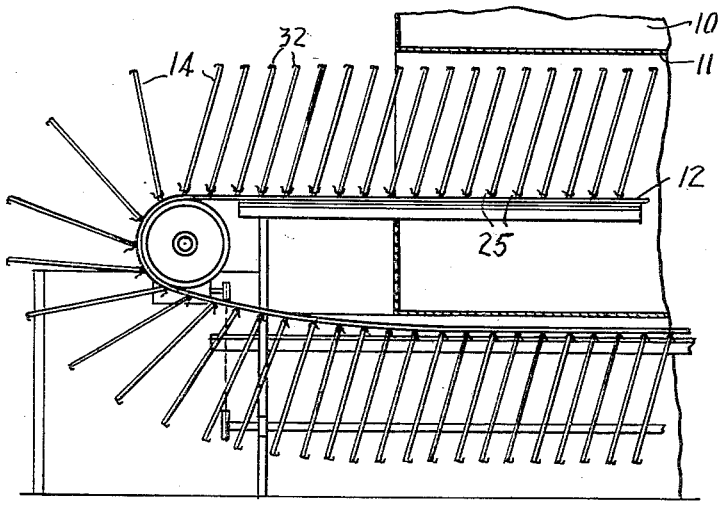
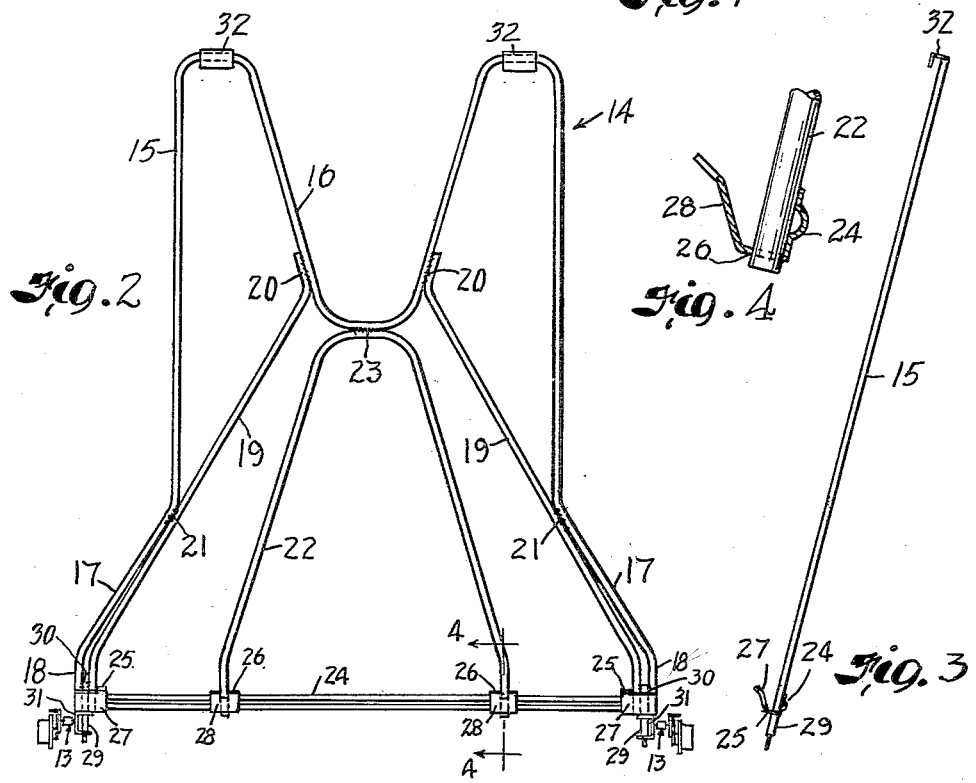
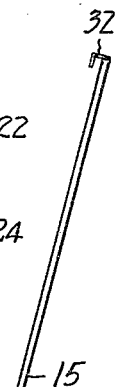
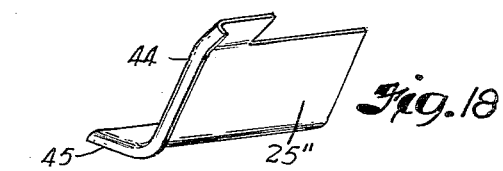
INVENTOR
JAMES D. RUSSELL
BY
Oberlin & Limbach
ATTORNEYS.

Jan. 28, 1958  J. D. RUSSELL  2,821,286
WICKET FOR SHEET CONVEYOR
Filed July 12, 1954  2 Sheets-Sheet 2
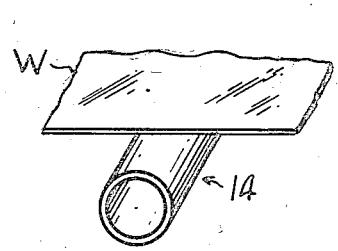
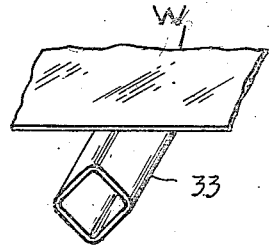
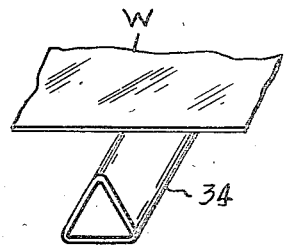
Fig. 5  Fig. 6  Fig. 7
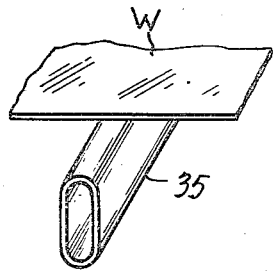
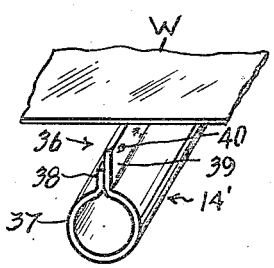
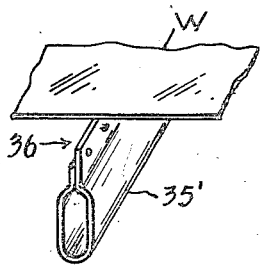
Fig. 8  Fig. 9  Fig. 10
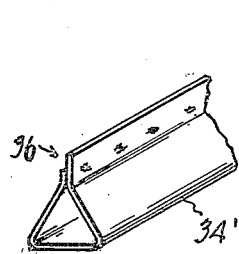
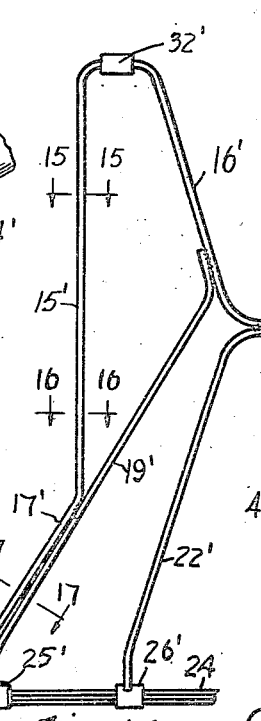
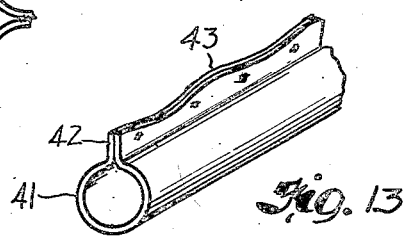
Fig. 11  Fig. 12  Fig. 13

Fig. 14
INVENTOR
JAMES D. RUSSELL
BY
Oberlin & Limbach
ATTORNEYS

United States Patent Office 2,821,286
Patented Jan. 28, 1958

2,821,286

WICKET FOR SHEET CONVEYOR

James D. Russell, Cleveland, Ohio, assignor to Young Brothers Company, Cleveland, Ohio, a corporation of Michigan Application July 12, 1954, Serial No. 442,530

11 Claims. (Cl. 198—134)

The present invention relates, as indicated, to wickets of the type used to support sheet material on conveyors and, more particularly, to a wicket for thus supporting a lithographed or coated thin metal sheet the same is moved by the conveyor through an oven in which the printing ink or coating is baked.

A complete sheet baking oven of this nature is disclosed in Patent No. 2,406,821, granted to V. A. Fox on September 3, 1946, and reference may be had thereto for a full detailed description of one form of this apparatus with which my improved wicket is adapted to be used. Briefly then, such oven construction includes an endless conveyor equipped with a great many racks or wickets arranged thereabout in closely-spaced, outwardly projecting relation and an enclosure through which such conveyor moves in continuous operation. Each wicket is adapted to receive a single metal sheet at one end of the oven as the same comes from the printing press or coater and to support the sheet on edge in its transport to the opposite or unloading oven end. The wickets are disposed at a slight rearward inclination relative to the direction of movement so that the sheets respectively rest against the front wicket surfaces, the uncoated sheet sides being engaged by the wickets. Gas burners or other heating means are operative cooperably with blowers to produce in the oven enclosure a circulation of heated air over the metal sheets, thereby to dry or oxidize the coatings.

The oven operating temperature is usually within the range of from 100 to 500° F., and as the loaded wickets move into the oven, the initial heat demand is high. For best results, it is necessary to bring the coated sheets and their supports quickly and evenly to the desired maximum temperature with the air temperature closely controlled to avoid the formation of localized hot or cold spots. Non-uniform drying resulting from such variation in heat intensity at different parts of the sheets causes marks to appear on the finish, known as "ghosting," thus rendering the same imperfect.

Since heating of the work is accomplished in this process by air flow thereover, a wicket functioning as indicated should not unduly interfere with the flow, either by producing dead spots or undesirable turbulence or by masking too great an area of the sheet from contact by the air, each of these conditions resulting in non-uniform baking of the finish. Moreover, only a very small temperature differential between the wicket body and the sheet can be tolerated so that there is no substantial conductive heat exchange between the two, which would also produce local hot or cold spots.

After passing through the baking region of the oven enclosure, and before exiting from the latter, the sheets are cooled rapidly by cool air flow thereover. The thus cooled sheets are then moved out of the enclosure to the unloading conveyor end, at which point they are taken from the conveyor and generally stacked. Unless the wickets are correspondingly cooled throughout in cooling of the sheets, they retain greater heat, in many instances to a degree such that they cause some reheating of the sheets in the travel between the enclosure and the point of removal. Such reheating is particularly undesirable when the sheets are stacked, since the cumulative effect of the increased latent heat of the individual sheets may be sufficient to cause the coatings to become tacky and the sheets, accordingly, to become stuck together in the stack.

In a sense conflicting with these requirements, which would indicate a thin wicket to be preferable, is the further necessity of providing sufficient strength to permit the wicket to withstand the repeated severe heat cycling and normally encountered stresses without losing its shape. The wicket must be, and remain, flat to avoid bending or buckling of the sheet.

It has been customary heretofore to form the wickets of wire, and, in order to obtain strength and durability, the tendency has been to use fairly heavy wire. An increase in the wire section, however, results in greater contact with, and hence obscuration of, the work and causes heating of the wicket to lag further behind heating of the work due to the added weight of the wicket. Furthermore, the already heavy load on the conveyor is increased by an increase in the individual wicket weight.

It is a primary object of my invention to provide a strong yet light wicket which provides very little contact with a sheet laid against the material-engaging face thereof. Such wicket thus affords the characteristics noted as desirable in the above and, additionally, reduces the load on the conveyor so that the same runs more smoothly and with less drive power required.

An additional object of the invention is to provide such a wicket having a heat cycle approximating that of the sheet material, thereby to avoid any considerable time lag in heating or cooling of the two to the desired temperature.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a fragmentary elevational view of a wicket type conveyor oven;

Fig. 2 is a front elevational view of one form of my improved wicket construction;

Fig. 3 is a side elevational view of such wicket;

Fig. 4 is a sectional view taken on the plane of the line 4—4 in Fig. 2;

Figs. 5, 6, 7 and 8 are fragmentary perspective views illustrating respectively various cross-sections of the wicket frame;

Figs. 9, 10, 11 and 12 are similar views of such cross-sections with each, however, including a common modification of the corresponding first forms thereof;

Fig. 13 is a fragmentary perspective view of a portion of a wicket frame illustrating a further modification of the basic wicket form;

Fig. 14 is a fragmentary elevational view of a wicket having a variable cross-section;

Figure 15:
Figure 16:
Figure 17:

Figs. 15, 16 and 17 are sectional views taken on the lines 15—15, 16—16 and 17—17, respectively, in Fig. 14 to show such variation in cross-section; and Fig. 18 is a view in perspective of a slightly modified clip which may be used at the bottom of my wicket frame for support of the sheet material.

Referring now to the drawings in detail, I have illustrated in Fig. 1 the unloading end of a wicket type conveyor oven, such as disclosed fully in the above-mentioned Patent No. 2,406,821, to show the general arrangement of the wickets as mounted by the conveyor and moved thereby through the oven enclosure, the latter being designated by reference numeral 10. Such enclosure has a tunnel or passage 11 in which the upper course of the endless conveyor 12 is disposed, hot air being circulated across the passage as indicated earlier.

The conveyor proper is in the form of two spaced chains, parts of which are shown at 13 in Fig. 2, and a number of wickets 14 are attached to the chains to extend outwardly in closely spaced relation thereabout, the attachment holding the wickets inclined slightly to the rear with respect to the direction of movement. The wickets respectively receive and support the sheets to be processed with the uncoated sheet sides resting against the front wicket faces. For convenience of illustration, the spacing of the wickets has been shown greatly exaggerated in Fig. 1.

Coming now to my improved wicket construction, the particular configuration thereof will first be considered with reference to the single wicket illustrated in Figs. 2 to 4. Such wicket comprises an outer frame member 15 of general M-shape, the upper notch thereof being indicated at 16, having lower leg portions 17 of increased convergence and substantially straight terminal leg portions 18. Interiorly thereof are two frame members 19 which extend upwardly from points respectively adjacent the ends 18 of member 14 convergently to a lesser degree than leg portions 17 so that members 19 contact the latter intermediate their ends. The upper ends of members 19 engage the respective sides of the notch 16 and are fastened thereto, preferably by brazing, as indicated at 20. Members 19 are also fastened to member 14, again preferably by brazing, at the regions of contact 21 with the leg portions 17 of the latter. A further internal frame member 22 of general inverted U-shape, having, however, upwardly tapering legs, is disposed inwardly of members 19 and fastened at its upper end 23 by brazing to the bottom of notch 16.

The wicket is completed by a lower rest bar 24 of rounded and flanged section, as shown most clearly in Fig. 4, to which the free ends of the several frame members are secured, overlying the flanges of the same. The bar is formed with end sheet rest clips 25 and two intermediate rest clips 26, all of which have forwardly extending arms, shown respectively at 27 and 28, to assist in placement and holding of one of the metal sheets on the wicket. Clips 26 coincide with the ends of frame member 22 to engage the same and assist in the fastening thereof, while end clips 25 are slightly wider to embrace the respectively associated ends of members 14 and 19, which are laterally spaced apart. A downwardly projecting anchor pin 29 is positioned between each pair of such latter end portions, extending through clip 25, and secured to these portions at its sides by brazed joints indicated by reference numeral 30. The lower pin extensions attach the wicket to links 31 of the chains 13. Spacers 32 are provided on the frame member 14 to maintain the wickets in their desired spaced-apart relation.

The wicket frame of Fig. 2 is fabricated of thin-walled tubing, either seamless or welded, having a circular cross-section, whereby the wicket is of light weight and, at the same time, very rigid. In addition, the circular section provides a line contact with a sheet laid against the frame, as illustrated in Fig. 5 wherein W designates the work, so that direct contact between the two is greatly minimized. Accordingly, the possibility of the wicket producing variations in heating of the sheet through engagement therewith is substantially reduced.

The advantages provided by this construction, set forth more fully at the outset, may be realized with tubing of other than circular cross-section, and I have illustrated several additional sections which may be used in Figs. 6 to 8. Thus, in Fig. 6 the tubing 33 is of square section, oriented so that a corner edge is adapted to engage the work W; the tubing 34 of Fig. 7 has a triangular section, again with a corner edge at the front face to contact the work; and in Fig. 8, tubing 35 is oval and disposed with its longer axis perpendicular to the sheet-engaging face thereof.

All such forms of the tubing may be modified by the provision of a longitudinal rib at the front face when arranged in the configuration of the wicket, the rib being indicated generally at 36 in Figs. 9 to 12 wherein the same is shown respectively formed on tubing of the different cross-sections noted. Since the rib is similar in each form, only that of the tubing 14' in Fig. 9 need be considered in detail. The tubing here is fabricated of flat strip shaped to the particular cross-section with a longitudinal seam 37 therein. The blank edges at the seam are flanged outwardly relative to the body respectively for unequal extents to form a relatively short flange 38 and a higher flange 39 and the two are securely fastened throughout substantially their entire extent, for example, by stitch-welding with closely spaced welds as indicated at 40. In use, only the outer edge of flange 39 engages the work thereby to present very little contact area, and the rib in all forms serves to increase the wear life of the wicket frame since it must be worn down before any wearing of the tube body can occur. If desired, the flanges could be made of equal extent to double the amount of material subject to wear without unduly enlarging the contact surface.

A further refinement, somewhat of the last-mentioned nature, is shown in Fig. 13 wherein the tubing 41 is formed with a rib 42 of double flange thickness. Here, however, the outer edge 43 of the rib is scalloped or undulating so that only the high points of the same contact the work, thereby affording increased wear material with an actual reduction of the contact area. It will be understood that a rib of this type may be used with tubing of any of the cross-sections discussed in the above.

Thus far, the various sections described have been considered in an alternative sense, that is, tubing of one or another such section may be used as desired completely to form the wicket, the particular selected section being uniform throughout. However, it is also possible to use combinations thereof to produce a single wicket of variable section, such as the wicket I have illustrated in Figs. 14 to 17. In this wicket, which is symmetrical, the vertical portions of outer member 15' and the inner members 19' and 22' are of upwardly tapering section, commencing with an oval section at their lower ends (Fig. 17) and changing gradually to a reduced circular section (Fig. 15). The oval section affords increased rigidity of the lower frame section, where it is of advantage in view of the cantilever-type mounting of the wicket, while the upper vertical and horizontal portions are lightened by use of the smaller circular section therein. It will be appreciated that even a small amount of weight reduction in an individual wicket affords a considerable total reduction of the conveyor load due to the great number of wickets employed.

As indicated, a wicket should not only be light, strong, and non-interfering with respect to the desired air flow across the engaged side of the work it supports, but it should not have a heat cycle which is substantially different from that of the work. Otherwise, the little contact that does exist, and of course, contact cannot be completely eliminated, may cause considerable heat exchange between the work and wicket productive of marks on the work finish. It has been found that the lightness of my tubular wicket and the distribution of the metal obtained, steel tubing being preferably used, reduces the normally encountered time lag in a heating-up of the wicket, and that the more nearly the wall-thickness approaches the thickness of the metal sheet, the more the lag is reduced. For this reason, it is preferred to use a tubing wall-thickness on the order of .020 inch, the tin plate sheets usually having a thickness of from .008 to .015 inch.

A sheet of this nature is easily distorted, and care must be taken in loading of the same on a wicket to insure that the forward edge is not bent by being accidentally forced against an edge of one of the rest clips provided at the bottom of the wicket. In order to reduce the possibility of such damage, the end or outer sheets rest clips may be modified by suitably rounding their inboard edges. A clip of this construction is shown in Fig. 18, and it will be seen therefrom that both the generally vertical and generally horizontal portions 44 and 45, respectively, of the inner edge are curved outwardly so that a sheet striking the same will be deflected without damage to its proper position. By rounding both end clips in this manner, the sheet may be fed from either side with the same protection. While there is little likelihood that a sheet would be fed so improperly as to strike one of the intermediate bottom rest clips, these may, if desired, also be modified by curving the edges thereof outwardly.

While I have shown a number of different tubular sections usable in accordance with the basic concept of the invention, these are not to be considered exhaustive. It is, however, important that the tubular wicket frame, regardless of its specific shape and manner of formation, be of tightly closed section throughout so that the wicket is able to withstand the torsional stresses encountered in used. This is in contrast to "open" tubing having an unsecured seam or any other form of opening therein, which would impair the torsional stress resistance of a wicket in which it is employed.

Other modes of applying the principle of the invention may be employed, change being made as regards the details described, provided the features stated in any of the following claims, or the equivalent of such be employed.

I therefore particularly point out and distinctly claim as my invention:

1. A wicket adapted in an inclined deposition thereof to support sheet material on edge with a face of the wicket in contact with a face of the material, said wicket being fabricated of thin-walled tubing having an outwardly directed rib formed along the length of the same, the rib of such tubing protruding at the face of the wicket against which the material is supported so that the latter is engaged by the rib, thus to provide substantially a line contact between the wicket and the sheet material.

2. A wicket as set forth in claim 1 in which such tubing is of circular cross-section.

3. A wicket as set forth in claim 1 in which such tubing is of oval cross-section with the rib projecting substantially in the plane of the longer axis thereof.

4. A wicket as set forth in claim 1 in which such tubing is of triangular cross-section with the rib projecting from a corner edge of the same.

5. A wicket as set forth in claim 1 in which such tubing is substantially rectangular in cross-section with the rib projecting from a corner edge thereof.

6. A wicket for sheet conveyors having a face adapted to be engaged by the sheet material transported by the conveyor, said wicket being tubular and provided with an outwardly projecting rib at the material-engaging face thereof which has an undulating outer edge, whereby the engagement of the wicket with the material is restricted to the high points of such rib edge.

7. A wicket for sheet conveyors comprising a tubular body having a longitudinal seam therein, the seam edges of said body being flanged outwardly respectively for unequal distances with such flanges securely fastened together throughout substantially their entire extent, such flanges protruding at the material-engaging face of the wicket so that the material is engaged by the longer of the flanges, thus to provide substantially a line contact therewith.

8. A wicket for sheet conveyors comprising a frame fabricated of tubing and having lower generally vertical portions of oval section with upper portions of reduced circular section, the major dimension of such lower portions extending substantially at right angles to the plane of the frame.

9. A wicket for use in a sheet conveyor including a pair of spaced chains, comprising a generally upright frame of thin tubular section having a plurality of lower extensions in spaced-apart relation at the bottom of the frame, the outermost two such extensions being separated approximately the same distance as such chains, a rigid rest bar extending across the bottom of the frame, the lower extensions of the latter being securely fastened to said bar in their spaced relation, sheet-supporting clips carried by the bar and projecting both outwardly and upwardly therefrom to one side of the frame, one such clip being located in the region of each outermost lower extension of the frame, and attaching members likewise in such lower marginal regions for securing the frame to the conveyor chains.

10. A wicket for use in a sheet conveyor including a pair of spaced chains, comprising a generally upright tubular frame of thin section having two marginal lower extensions which are spaced apart approximately the same distance as such chains, said frame further including inner brace members the lower ends of which are in spaced relation and intermediate such marginal extensions, a rigid rest bar extending across and securely joined to the lower end portions of the marginal extensions and inner brace members, sheet-supporting clips carried by the bar and projecting both outwardly and upwardly therefrom to one side of the frame, two of said clips being respectively adjacent the frame margins and at least one additional clip being provided therebetween, and attaching members in the lower marginal regions of the frame for securing the same to the chains of the conveyor.

11. A wicket for use in a sheet conveyor including a pair of spaced chains, comprising an outer tubular frame member of general M-shape adapted to be connected in the conveyor with its closed and notched end outermost, inner brace members secured to said frame member in the region of the notch thereof and extending to the base of the same in spaced relation, the frame and brace members being planar, with the lower ends of the frame member legs separated approximately the same distance as such chains and the lower end portions of the brace members between the same, a rigid rest bar extending across and securely joined to the lower end portions of the frame and brace members, a plurality of sheet-supporting clips carried by said rest bar and projecting both outwardly and upwardly therefrom to one side, said clips being positioned approximately at the intersections of the frame and brace members with the bar, and attaching elements respectively adjacent the connections of the frame member and bar for securing the wicket to the chains of the conveyor.

References Cited in the file of this patent

UNITED STATES PATENTS

| | | |
|---|---|---|
| 2,309,259 | Seigh | Jan. 26, 1943 |
| 2,316,177 | Melzer | Apr. 13, 1943 |